US012619314B2

(12) United States Patent
Fedder et al.

(10) Patent No.: US 12,619,314 B2
(45) Date of Patent: May 5, 2026

(54) ULTRASONIC ARRAY FOR HAPTIC RENDERING

(71) Applicant: CARNEGIE MELLON UNIVERSITY, Pittsburgh, PA (US)

(72) Inventors: Gary K. Fedder, Pittsburgh, PA (US); Jace Rozsa, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 18/986,255

(22) Filed: Dec. 18, 2024

(65) Prior Publication Data

US 2025/0199617 A1      Jun. 19, 2025

Related U.S. Application Data

(63) Continuation-in-part of application No. PCT/US2024/057429, filed on Nov. 26, 2024.

(60) Provisional application No. 63/604,625, filed on Nov. 30, 2023.

(51) Int. Cl.
*G06F 3/01* (2006.01)
*G06V 40/13* (2022.01)

(52) U.S. Cl.
CPC .......... *G06F 3/016* (2013.01); *G06V 40/1306* (2022.01)

(58) Field of Classification Search
None
See application file for complete search history.

(56) References Cited

U.S. PATENT DOCUMENTS

| | | | |
|---|---|---|---|
| 2014/0139328 A1 | 5/2014 | Zellers et al. | |
| 2014/0355381 A1* | 12/2014 | Lal | G01S 15/02 |
| | | | 327/356 |
| 2022/0199895 A1 | 6/2022 | Oh et al. | |
| 2023/0033861 A1* | 2/2023 | Pallerla | G06V 40/1306 |

FOREIGN PATENT DOCUMENTS

IN      360223 B      3/2021

OTHER PUBLICATIONS

The International Search Report and Written Opinion mailed Jan. 27, 2025 for corresponding PCT/US24/57429 (eightg (8) pages).

* cited by examiner

*Primary Examiner* — Stephen T. Reed
(74) *Attorney, Agent, or Firm* — KDW FIRM PLLC

(57) ABSTRACT

A wearable, low power, compact ultrasonic haptic device that focuses ultrasound at or below the skin's surface using a piezocomposite transducer consisting multiple arrayed acoustic pixels, each acoustic pixel comprising an array of piezocomposite pillars separated by an epoxy and topped by a metal electrode. The high efficiency of the piezocomposite transducer facilitates sufficient production of ultrasonic energy directed at a focal point at or below the surface the skin to stimulate a tactile sensation.

29 Claims, 12 Drawing Sheets

102

104

ULTRASONIC ARRAY FOR HAPTIC RENDERING

RELATED APPLICATIONS

This application is a continuation-in-part of PCT Application No. PCT/US2024/057429, filed Nov. 26, 2024, which claims the benefit of U.S. Provisional Patent Application No. 63/604,625, field Nov. 30, 2023. The contents of these applications are incorporated herein their entireties.

FIELD OF THE INVENTION

This invention is related to the haptic feedback and, in particular, is directed to devices for providing tactile rendering to a portion of a human body, for example, the fingertip of an individual.

BACKGROUND

Haptic technologies play a crucial role in many modern systems, from user electronics to virtual reality. In cooperative robotic applications, haptics is used to communicate important information to the user about the environment in which the robot is operating and is particularly useful when the robots are being operated remotely (i.e., teleoperation). This information is typically transmitted in two modes: kinesthetic (larger forces applied to the user which are felt in joints) and tactile (forces imparted to the skin).

Haptics are also an important information modality for robot action to be learned through demonstration by humans. Haptic displays can provide rich tactile information through the natural means of human mechanoreceptors, thereby not overloading cognitive ability. In contrast, other possible modalities, such as conveying tactile information through a visual display, could be much more difficult and time-consuming for a human to interpret.

For tactile haptics, the device ideally provides a stimulus without inhibiting the user's range of motion. In other words, tactile devices must be wearable. Therefore, technologies that are lightweight, low-power, and small are desirable. Additionally, the stimulus must be able to convincingly mimic real world surfaces and textures. These two requirements have proven challenging for current technologies.

Contemporary tactile devices are still far from recreating reality in a satisfactory manner. The majority of tactile stimulation technologies rely on actuators which impart a force to the skin through direct physical contact. These actuators are typically worn on the finger along with the electrical components which drive the motors. Hydraulic, shape memory and vibrating motor actuators have been incorporated into large-scale arrays and are used to simulate movement across the skin, such as a caress. These devices typically incorporate individual actuators on the scale of millimeters to centimeters in size.

Such large individual actuators are bulky and awkward to wear. Miniaturization challenges exist in scaling mechanical actuators into arrays for small areas like fingertips. Many actuators must be physically anchored to produce forces large enough to be sensed. For wearable applications, this often places a limit on how small individual stimulators can be, as extra hardware for physical anchoring takes space. Actuation for haptics also suffers from problems of localizing the stimulus. If one actuator is triggered it can often be felt in a larger area beyond the point of actuation.

A spatially imprecise stimulation can reduce the effectiveness of haptic rendering. As an alternative to mechanical actuators, ultrasonic waves can be used to stimulate tactile sensations. In such applications, energy is transferred from the impinging wave to the surface of the skin through acoustic radiation force, delivering a tactile sensation to the user. Mid-air ultrasonic haptic devices are a common application which exploits this mechanism. In such applications, a large array of ultrasonic transducers focuses ultrasonic power at a given point in space. A tactile sensation is felt when the focused ultrasonic waves impinge on the skin of the user. Because the frequency range of ultrasound is outside the sensitive range for human mechanoreceptors, the carrier signal must be modulated, either spatially or temporally, at frequencies under 1 kHz. To overcome the high attenuation of ultrasound in air, these devices must be relatively large (typically over 100 transducers are used, with each transducer having a footprint on the order of a square centimeter) and have high power requirements, with peak power consumption reaching 80 W for some systems.

One example of an attempt to remedy the limitations of operating in air involves placing ultrasonic transducers directly on the back of the hand, driving ultrasonic energy through the tissue and bone, and focusing to a point on the palm. While this technique reduces power consumption, the devices are still quite large and only capable of producing a single focal point on the hand at a time.

Therefore, there is a need for a device which is scalable for small applications, lightweight, does not require physical anchoring and which can deliver a spatially precise stimulus.

SUMMARY OF THE INVENTION

The device disclosed herein addresses the deficiencies noted above and provides multiple advantages over prior art devices. Disclosed herein is an ultrasonic haptic device that focuses ultrasound energy at or below the skin's surface using a piezocomposite phased array transducer. The high efficiency of the piezocomposite transducer facilitates sufficient production of ultrasonic energy to stimulate a tactile sensation without requiring a large number of transducers. The device is an order of magnitude smaller than previous similar tactile haptic technologies. The device is lightweight and requires no physical anchoring. Additionally, it delivers a spatially precise stimulus, making the proposed technology a good candidate for scaling to next generation skin-wearable haptic rendering systems.

DEFINITIONS

As used herein, the term "approximately" implies that a stated value may vary by ±10%.

DETAILED DESCRIPTION

Figure 1:
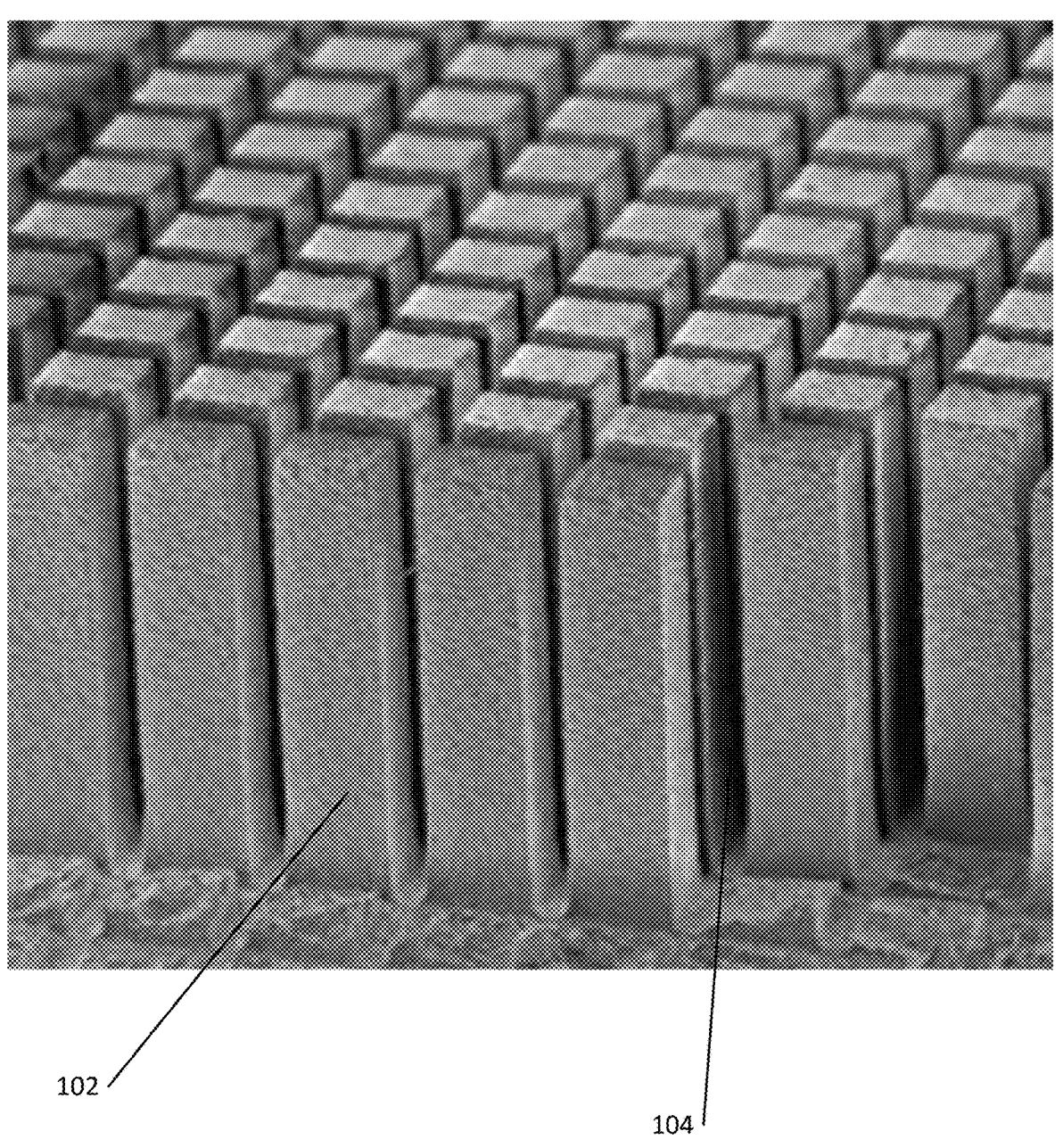
FIG. 1 is a SEM image of an array of PZT pillars.

In the device of the present invention, the ultrasonic energy required to stimulate a tactile sensation is produced using a piezoelectric transducer. The transducer material is a lead zirconate titanate (PZT) piezocomposite. The piezocomposite is composed of high aspect ratio PZT pillars 102, shown in FIG. 1. In one embodiment, pillars 102 are square in cross-sectional shape and are approximately 125 μm×125 μm×1.5 mm and are spaced 50 μm apart with an epoxy filler 104 disposed between pillars 102. In this embodiment, the volume ratio of epoxy to PZT is 1:1, The spacing of the pillars and the volume ratio of epoxy to PZT may vary from embodiment to embodiment of the invention. Preferably, the aspect ratio of each pillar will be greater than or equal to 10. As shown in FIG. 1, in an exemplary embodiment, the pillars have a square cross-sectional shape in the longitudinal direction, but other shapes (e.g., round) may work equally well. Other piezoelectric composite materials may also work well, such as piezoelectric fibers bundled and then bonded and voids between the fibers filled with epoxy.

Figure 2:
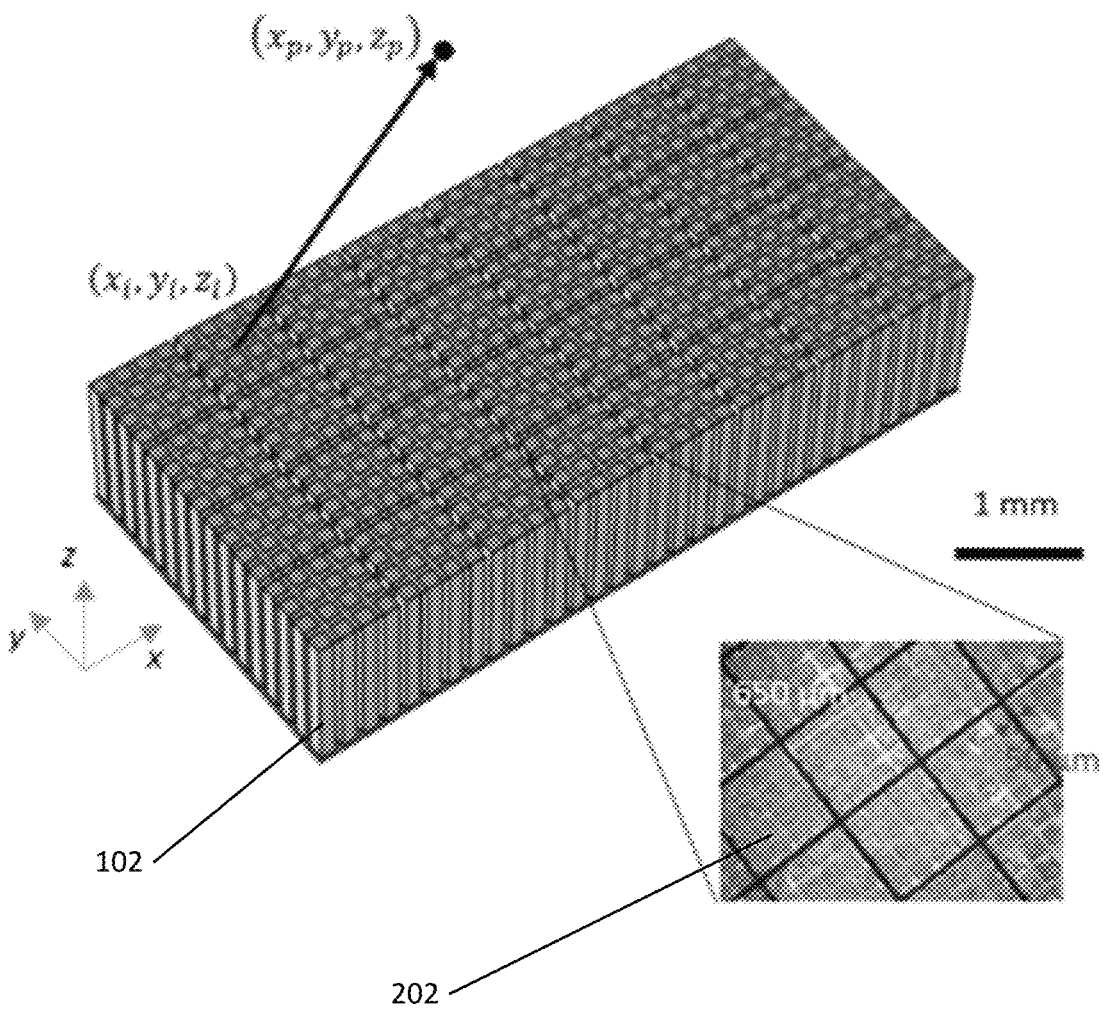
FIG. 2 is a schematic representation of a 4×8 array of acoustic pixels.

Thin-film metal electrodes are then deposited on the tops of one or more pillars 102 to form acoustic pixels 202. FIG. 2 is a schematic depiction of a 4×8 array of acoustic pixels 202. The metal electrodes are visible in the image inset of FIG. 2, in which each acoustic pixel 202 is formed by a 4×4 array of pillars 102 topped with the metal electrode. In a preferred embodiment, the electrodes are composed of a copper layer with a very thin tin layer thereon, but other metals and alloys may also be used. In one embodiment, the electrodes comprise a layer of copper 2-3 microns in thickness covered by a very thin layer of tin. The electrodes are made of either a sputtered thin film of metal and/or electroplated metal. There may be multiple metal layers, (e.g. one as an adhesion layer to the PZT and then a layer that is solder wettable). The metal layer is coated over the entire device and then patterned to create the individual electrodes. In the exemplary embodiment shown in FIG. 2, each individual electrode covers a 4×4 array of pillars to form each acoustic pixel 202. The size of the electrode can be designed independent of the pillars however, electrodes should be sized to completely overlap the pillars, and not partly covering a pillar. As would be realized, the acoustic pixels 202 may be formed from any number of pillars 102.

Figure 3B:
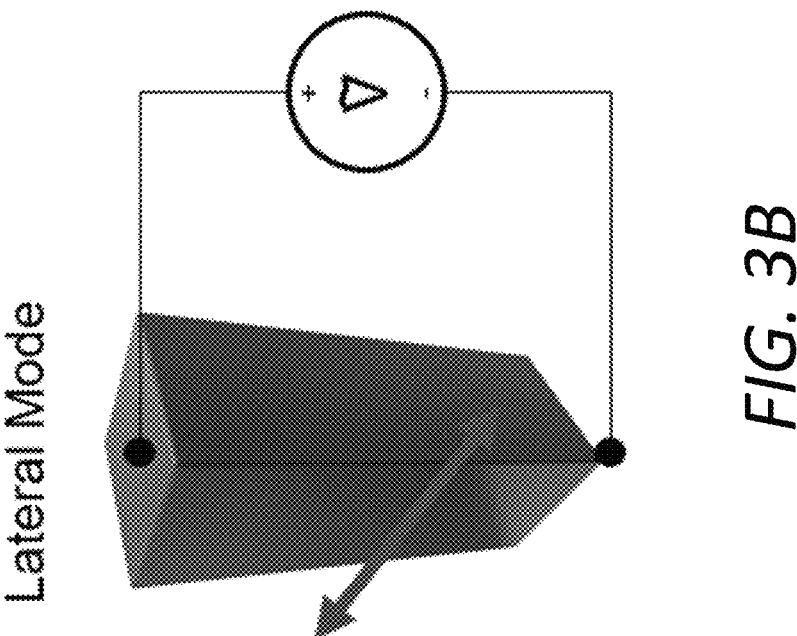
FIGS. 3(A-B) are schematic representations of the longitudinal and lateral modes of a PZT pillar.
Figure 3A:
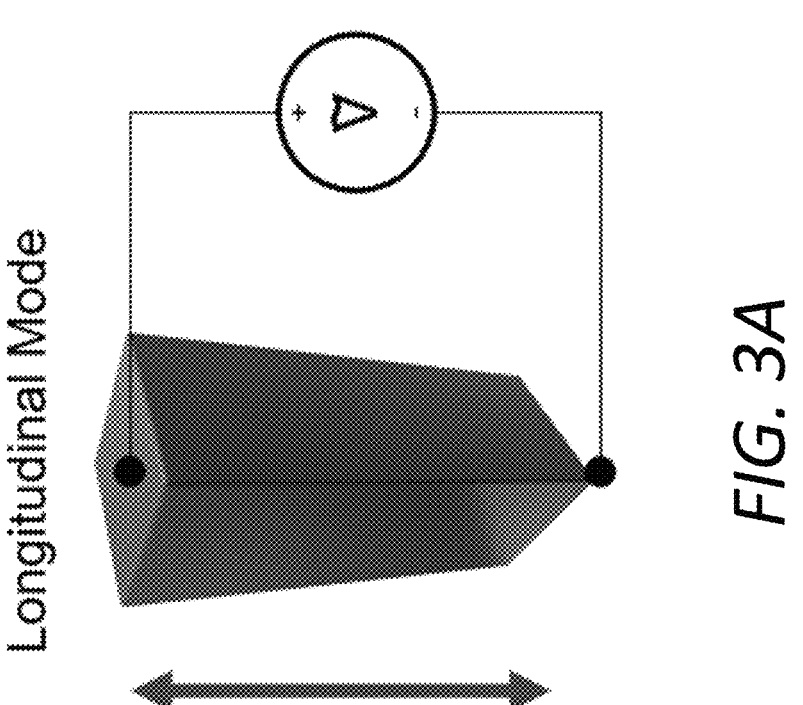

Driving a piezoelectric transducer at the resonant frequency maximizes the amount of ultrasonic power produced. The unique structure shown in FIGS. 1 and 2, as compared to a uniform PZT transducer, reduces the lateral modes at resonance and therefore increases the efficiency of the transducer. As shown in FIG. 3. the resonant frequency of the fundamental mode is inversely proportional to the length dimension along that mode, in accordance with the Eq. (1):

$$\omega_0 = \frac{\pi \cdot v}{d} \tag{1}$$

where:

v is the speed of sound in PZT; and d is the length of the PZT pillars.

Unlike in ultrasonic imaging applications, where achieving spatial imaging resolution requires high signal bandwidth, ultrasonic haptic stimulation requires persistence over time periods that are relatively long compared to the period of the ultrasonic drive frequency. For example, tactile sensations in humans occur at frequencies no higher than 400 Hz while an exemplary ultrasonic drive frequency of 1 MHz has a period of 1 μs. The resulting 400 Hz modulation corresponds to bursts of 1250 ultrasonic cycles. Such large bursts of cycles enable running haptic stimulation at the drive frequency set at the transducer resonance and running at a high quality factor. At the high quality factor, resonant operation is advantageous as it enables a build-up of ultrasonic energy for a given drive voltage. To maximize ultrasonic output, the transducer is driven at resonance in its fundamental piston (i.e., longitudinal) mode. The corresponding resonance frequency is inversely proportional to the thickness of the piezocomposite (i.e., the pillar height). For the 1.5 mm height, the resonance frequency is nominally 1 MHz.

To keep system power requirements down, it is imperative that the maximum amount of ultrasonic energy arrive at the target. One important source of loss in ultrasonic systems is energy reflection due to impedance mismatch between the originating material and the target material. The proportion of wave reflected when an incident wave is travelling normal to the material interface is given by Eq. (2):

$$\Gamma = \frac{Z_2 - Z_1}{Z_2 + Z_1}$$

Where:

$Z_1$ and $Z_2$ are the acoustic impedances of the originating material and the target material, respectively.

The piezocomposite used for the transducer of the present invention has a specific acoustic impedance of roughly 20 MRayl. The acoustic impedance of human skin is around 1.5 MRayl. This difference produces a reflection coefficient of negative 0.86. In other words, 86% of the acoustic wave incident upon this interface is reflected, while only 14% is transmitted. Note that the acoustic impedance of the piezocomposite is an effective impedance which is a result of combining the individual impedances of the piezoelectric pillars and the epoxy filler.

Figure 4:
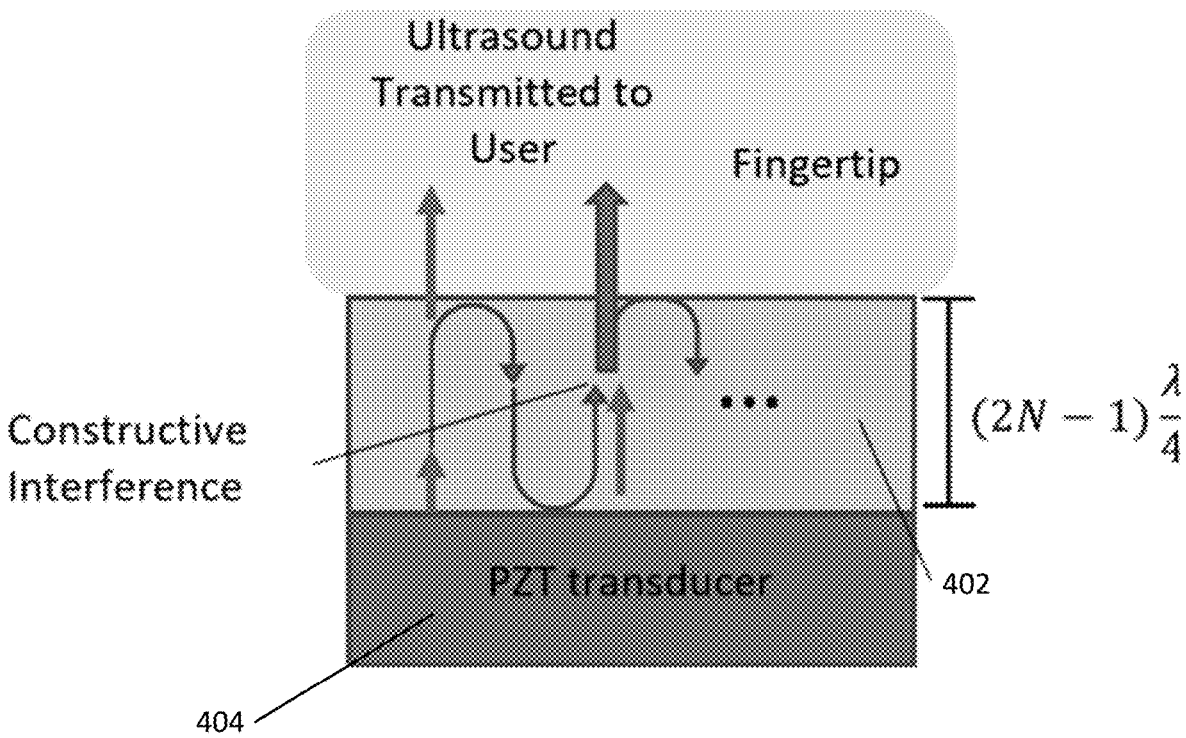
FIG. 4 is a schematic illustration of the PZT transducer with the matching material.

To reduce this loss, a matching layer 402 is disposed atop the array of acoustic pixels 404, as illustrated in FIG. 4. The material of which the matching layer 402 is composed is selected to have an acoustic impedance in between that of the target and originating materials, where the optimal matching impedance is given by Eq. (3):

$$Z_{m,opt} = \sqrt{Z_2 Z_1} \tag{3}$$

which is 5.5 MRayl when the originating material is the piezocomposite and the target material is human skin. The point of contact with the human skin is on the matching layer 402.

In addition to selecting a material with the desired acoustic impedance, the reflected waves in the forward direction through the matching layer 402 must constructively interfere by setting the thickness of matching layer 402 to an odd multiple of quarter wavelengths (i.e. $(2N+1)\lambda/4$, where $N \geq 0$. Neglecting attenuation loss in the matching material, the ratio of transmitted energy with to without the quarter-wave matching layer 402 is then given by Eq. (4):

$$\alpha = \left( \frac{4 Z_m Z_{skin}}{Z_m^2 + Z_{PZT} Z_{skin}} \right)^2 \frac{Z_{PZT}}{Z_{skin}} \qquad (4)$$

In one embodiment of the invention, the material of matching layer 402 is poly(methyl methacrylate) (PMMA), which has an acoustic impedance of 3.2 MRayl. This polymer increases the transmitted energy by 1.7 times compared to no matching layer. Other materials may be used. The point of contact with the human skin is on the matching layer 402. A thin layer of oleogel may be placed between the matching layer 402 and the human skin to improve the energy coupling into the skin and thus improve the feel of the contact. The oleogel acts as an intermediate material through which the ultrasonic wave may travel, but it also reduces the mechanical loading on the finger's mechanoreceptors, which increases the sensitivity to the stimulus.

Figure 5:
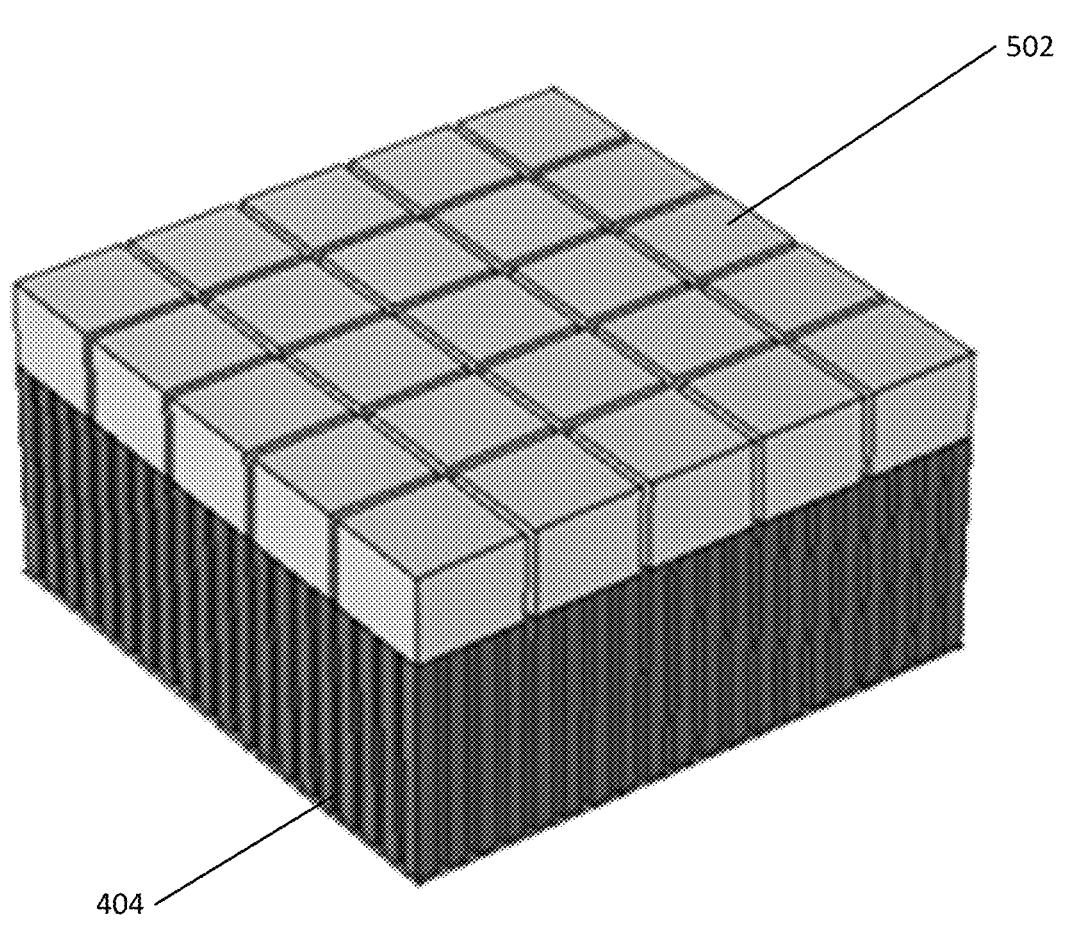
FIG. 5 is a schematic illustration of a second embodiment using a segmented matching layer.

The presence of continuous intermediate matching layer 402 may cause coupling between elements of the phased array, which would counter the high efficiency geometry of the piezocomposite by allowing acoustic energy from the transducer to excite spurious modes in the intermediate layer. This would have a negative impact on the acoustic focusing capability of the phased array. One way to avoid the effects of reflections in the intermediate material is to use a patterned polymer (e.g., an epoxy-based photoresist such as SU-8 or another photolithographically definable polymer) as the coupling material, rather than PMMA. The advantages of this are twofold. First, the patterned polymer can be lithographically patterned to match the footprint of the phased array grid, wherein each pixel of the phased array is provided with an isolated segment of the material. This creates an intermediate layer of material that is mechanically uncoupled from neighboring phased array elements. This embodiment is shown in FIG. 5, showing the segmented matching layer 502. The second advantage, an additional aspect of the invention, is that the patterned polymer can be loaded with nanoparticles to tune its acoustic impedance to a calculated optimal value (e.g., 5.5 MRayl). In one embodiment, titanium oxide ($TiO_2$) nanoparticles may be used at an approximate weight ratio of 30% nanoparticles to the patterned polymer. The nanoparticles are mixed with the polymer by hand mixing or ultrasonic mixing. In other embodiments, nanoparticles of other materials and in other weight ratios may be used, depending on the application. The pixelated intermediate layer enables direct design of the phasing in the array to form optimal focal points, avoiding the acoustic coupling issues between array elements.

Figure 6:
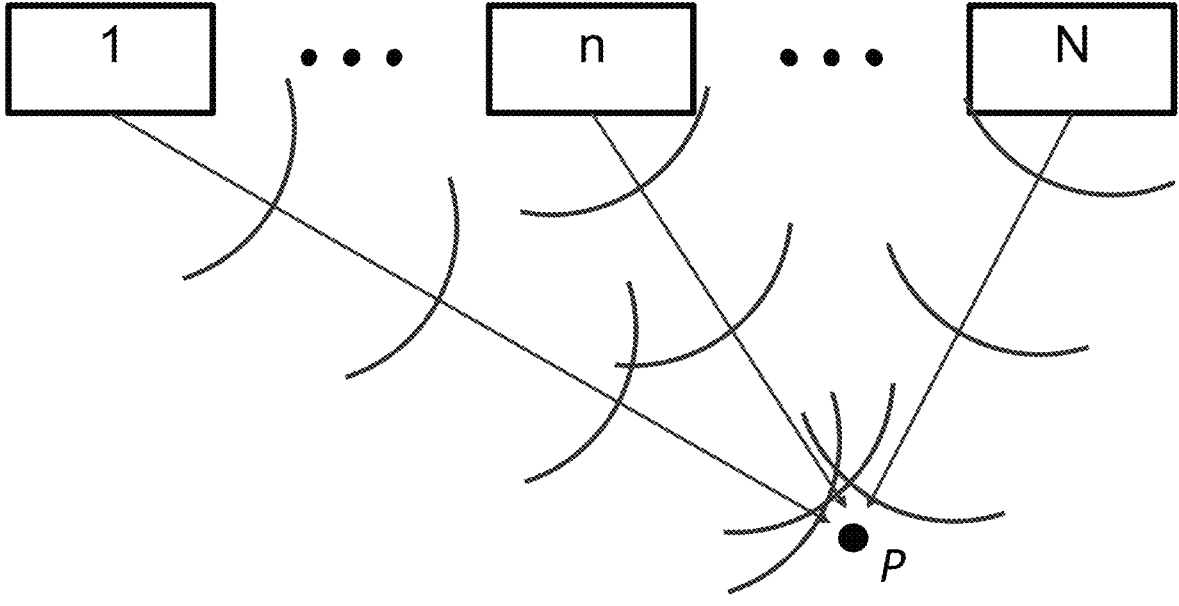
FIG. 6 is a schematic diagram showing focusing of the acoustic energy at point P.

To further increase the ultrasonic pressure level at or under the skin surface and to create a maximum of ultrasonic energy in a small volume, phased array focusing is used. To focus the ultrasound at point P, the drive signal applied to each transducer element is time delayed (i.e., phased) such that the ultrasonic waves constructively interfere at point P, that is, it is desirable that the peaks of the wavefronts from each acoustic pixel meet at point P at the same time, as shown in FIG. 6. This phase delay is given by Eq. (5):

$$\Psi_i = \frac{2\pi f}{v_p} \sqrt{(x_i - x_p)^2 + (y_i - y_p)^2 + (z_i - z_p)^2} \qquad (5)$$

where:
f is the frequency of excitation
$v_p$ is the speed of sound in the medium; and
($x_i$, $y_i$, $z_i$) and ($x_p$, $y_p z_p$) are the center point of the element i in the array and the desired focal point, respectively, as illustrated in FIG. 6.

An ultrasonic phased array requires that each element be driven independently from the others. To this end, lithographic patterning and etching of the 2.5 μm thick copper-tin electrode on the top of the piezocomposite creates a uniform grid of electrically independent electrodes that aligns with the underlying PZT pillars. Each electrode in the grid connects a 4×4 sub-array of pillars to create individual and independent resonators (i.e., acoustic pixels) with a pitch of 700 μm. The overall footprint of the complete phased array is 5.5 mm by 2.8 mm.

A flexible printed circuit board (PCB) with a 4×8 grid of electrodes mates to the etched electrodes of the piezocomposite. A device bonder aligned and assembled the PCB to the piezocomposite with electrical connections established with a flexible conductive epoxy.

Figure 7:
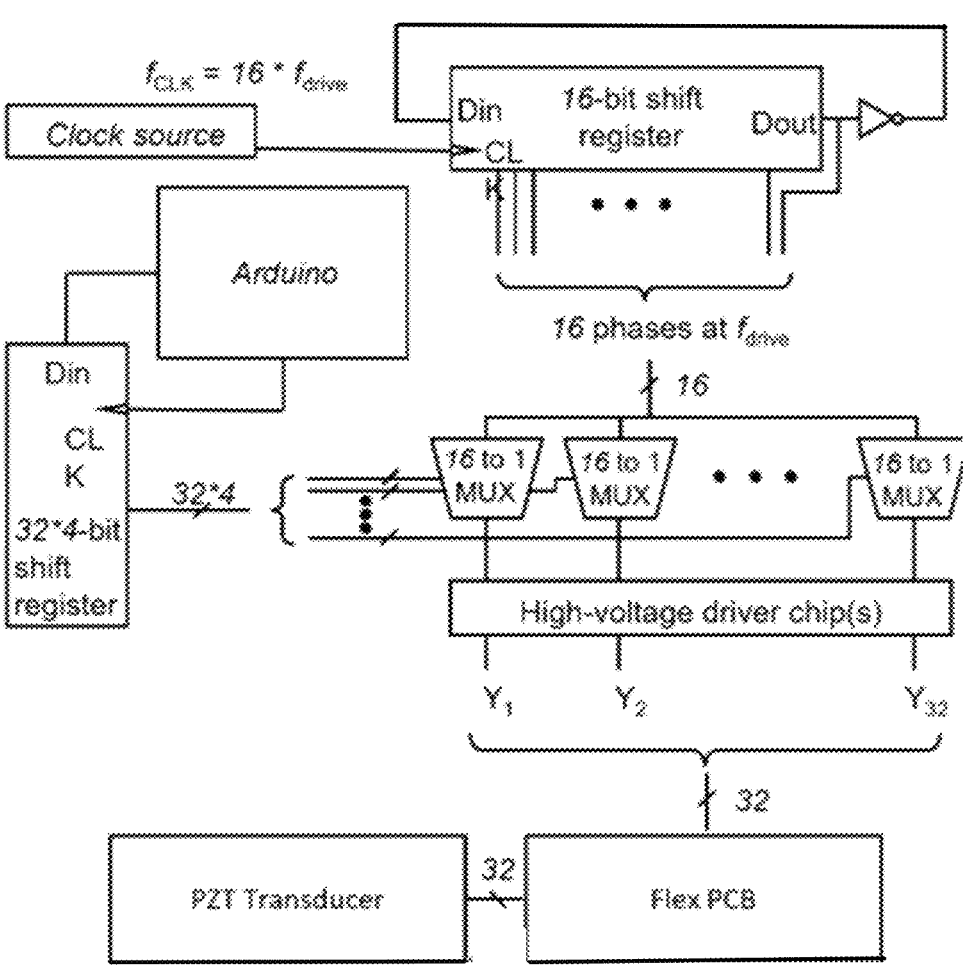
FIG. 7 is a schematic diagram of the drive electronics for the phased array of acoustic pixels.

One embodiment of drive electronics for the phased array is shown schematically in FIG. 7 and comprises a digital square wave generating board and an analog board that outputs signals 20V in amplitude. This embodiment of the circuit generates 32 independent outputs, one for each element in the 4×8 array, and have a phase resolution of π/8 radians.

Figure 8:
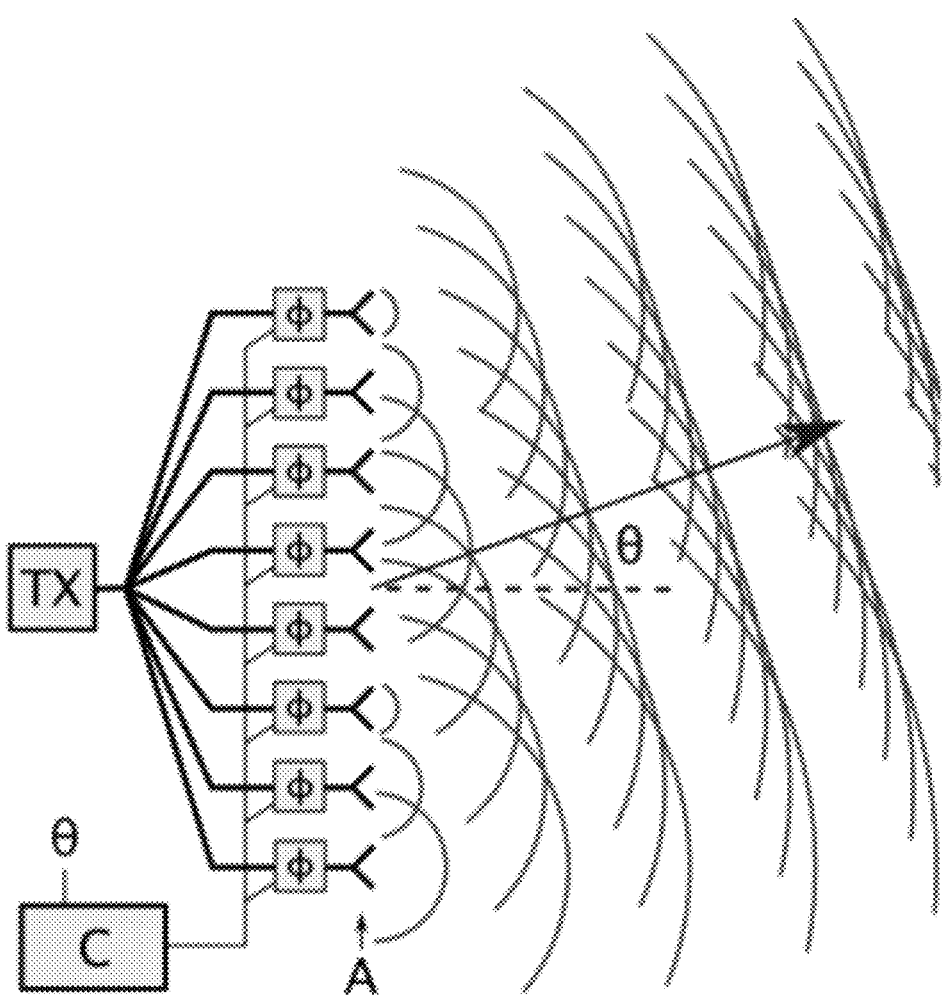
FIG. 8 is a schematic diagram showing the operation of the phased array of pixels.

FIG. 8 is a schematic diagram showing operation of the phased array. A steering effect can be accomplished by changing the phase of the signals or the phase and amplitude of the signals emitted by each pixel. The phase shift is given by Eq. (6):

$$\Phi = \frac{2\pi d}{\lambda} \sin(\theta) \qquad (6)$$

In this case, $\Phi$ is a progressive phase shift between each pixel and d is the distance to the focal point. Note that when the device is used with human skin, it is preferable that the focal point be 1-2 mm below the surface of the skin, which is where the mechanoreceptors producing the sensation are located. The device is capable of focusing energy within a voxel of diameter approximately equal to half of the wavelength in the skin tissue. With an exemplary drive frequency of 1 MHz, the acoustic wavelength in human skin is approximately 1.6 mm and energy is focused into a voxel under the surface of the skin that is approximately 1 $mm^3$.

Figure 9:
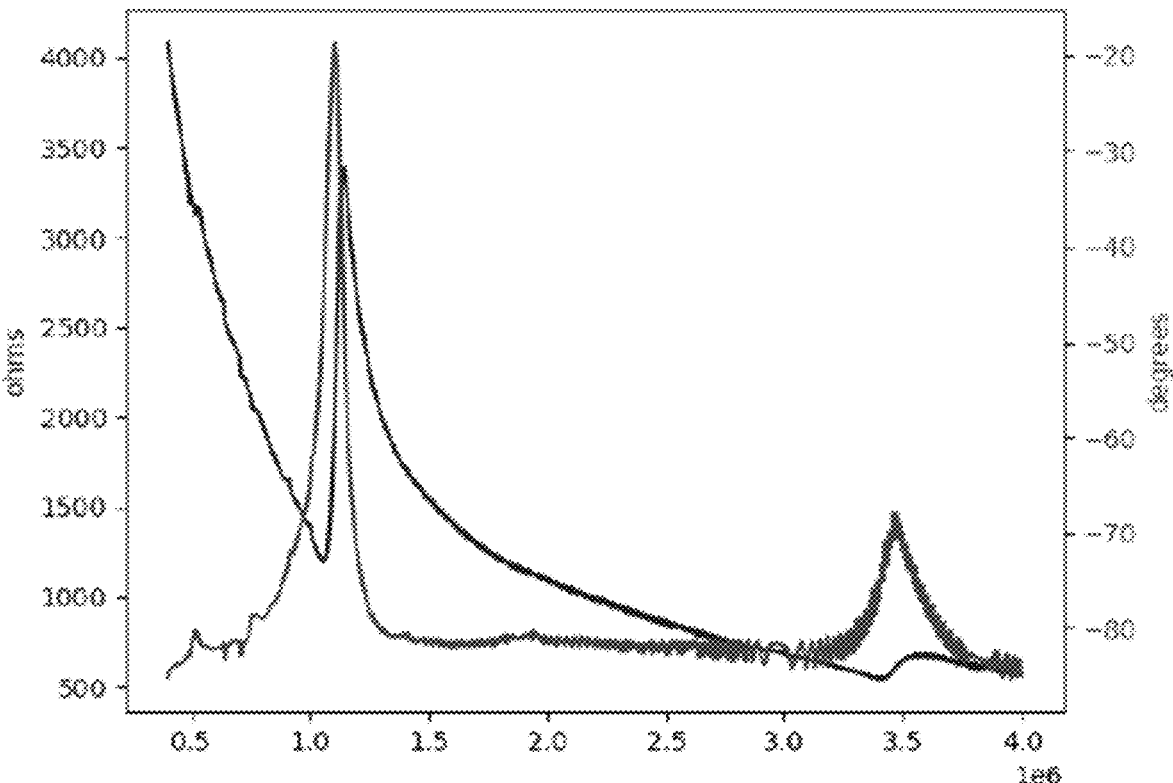
FIG. 9 is a graph showing the impedance spectrum of the array of acoustic pixels with all pixels driven in parallel.

The electrical impedance spectrum of the device with all pixels driven in parallel is shown in FIG. 9. Resonance occurs at the dip in the impedance at 1.06 MHz. To experimentally verify the focusing capabilities of the device, a test setup was constructed to systematically measure the ultrasonic wavefront at precise locations in space. The setup comprised a 3D printer modified to hold a hydrophone. The measurements were taken in water, which reduced the ultrasonic attenuation and minimized the input voltage requirement of the system. Additionally, the specific hydrophone used has an effective diameter of 1 mm. This is a size on the order of the wavelength of the ultrasound in water (roughly 1.5 mm at 1 MHz) which means that an averaging effect will occur, causing the focal point to appear larger than its true size. This effect will also cause the measured amplitude of the focal point to be smaller than the true value. To produce ultrasonic waves in water, an open plastic container of water was placed on top of the transducer, with the electrically grounded side of the device in direct contact with a thin polyimide film sealing the bottom of the container. This polyimide film was 35 μm thick, far less than the ultrasonic wavelength by about a factor of 60, making it effectively invisible to the ultrasonic wave. Ultrasonic coupling gel was applied to the transducer to eliminate air gaps between the device and the container. The hydrophone was immersed in the water from the open end of the container.

For validation of focusing in phased array operation, the coordinate system is chosen to match that of FIG. 2. The focal point for the phased array was set 0.25 mm above the surface of the bottom of the plastic water container and centered directly above the phased array. The transducer was driven at resonance. No matching material is placed between the device and the water tank.

Figure 10A:
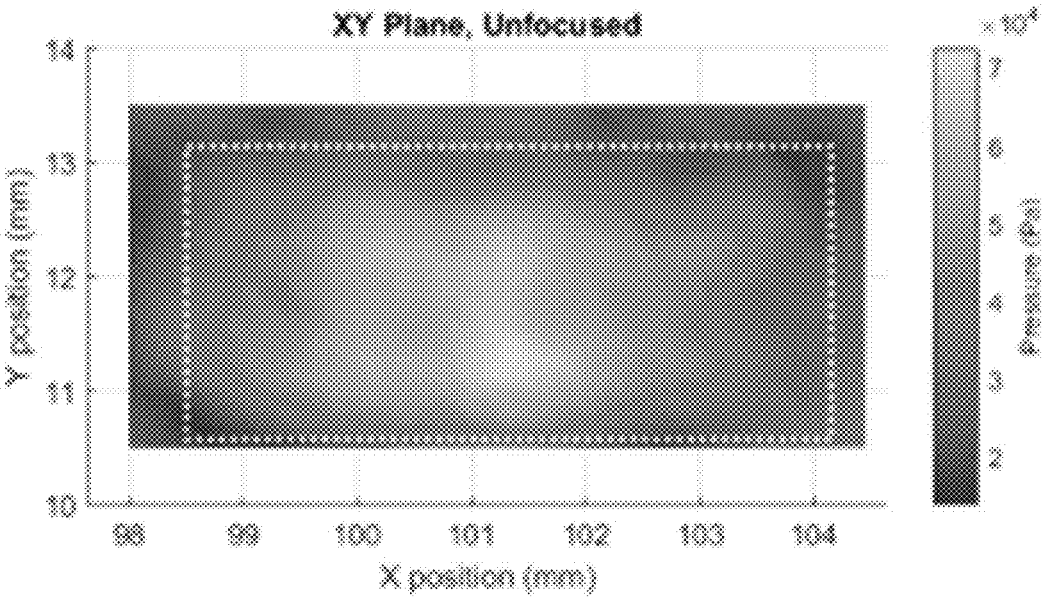
FIGS. 10(A-B) show ultrasonic wavefronts produced by a phased array in unfocused and focused configurations, respectively.
Figure 10B:
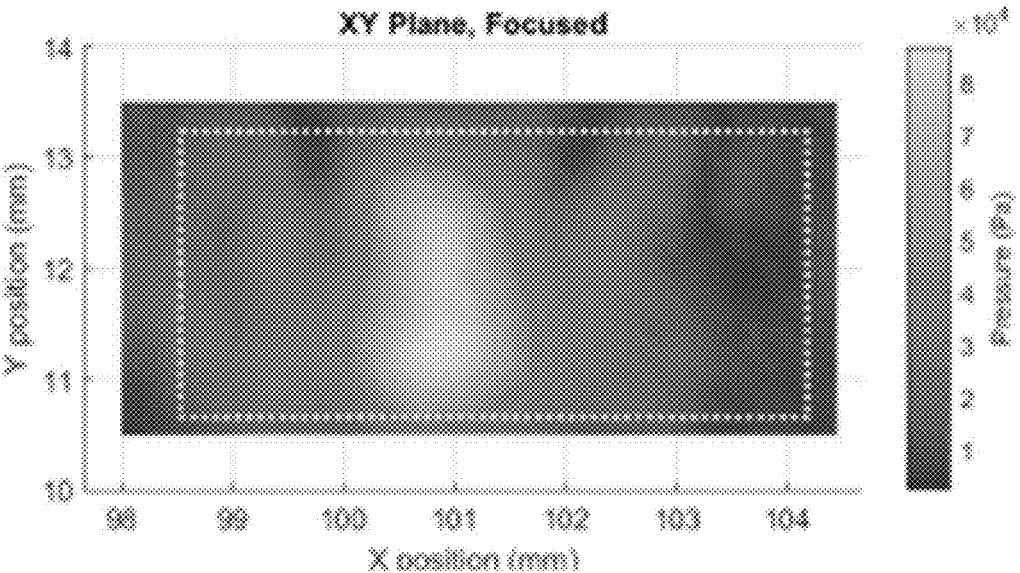

FIGS. 10(A-B) show the produced wavefronts measured with the hydrophone (note that this plot only contains amplitude information, not phase). In FIG. 10A, each element in the array was driven with the same phase, producing a uniform plane wave. This plot acts as a baseline from which to compare the focusing plot. FIG. 10B shows the result of driving each element in the array with a unique phase calculated so that the focal point occurs in the plane where the hydrophone is positioned. As can be seen from the plots, driving the transducer in the phased array configuration has a measurable effect on both the shape and amplitude of the resulting ultrasonic wavefront. Specifically, the amplitude is increased by about 20% when phased array focusing is implemented. The white dotted line in the figures show the approximate outline of the phased array.

Figure 11A:
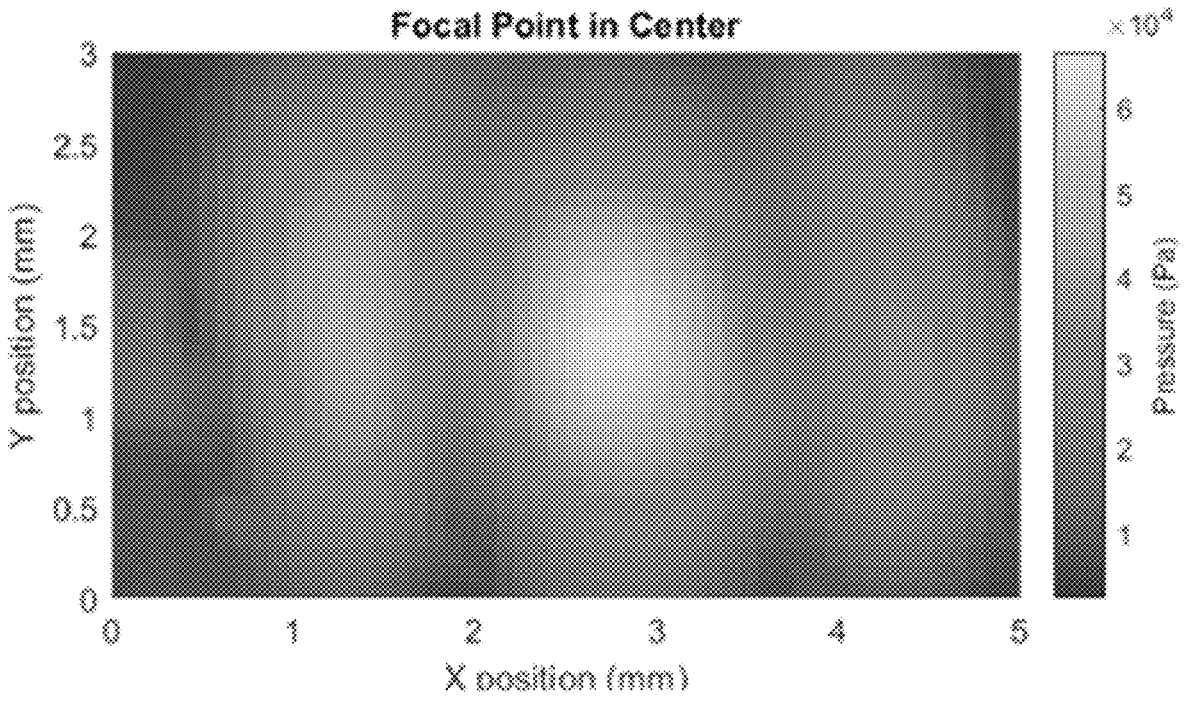
FIGS. 11(A-B) show ultrasonic wavefronts with the focal point in the center of the array and the focal point off-center, respectively.
Figure 11B:
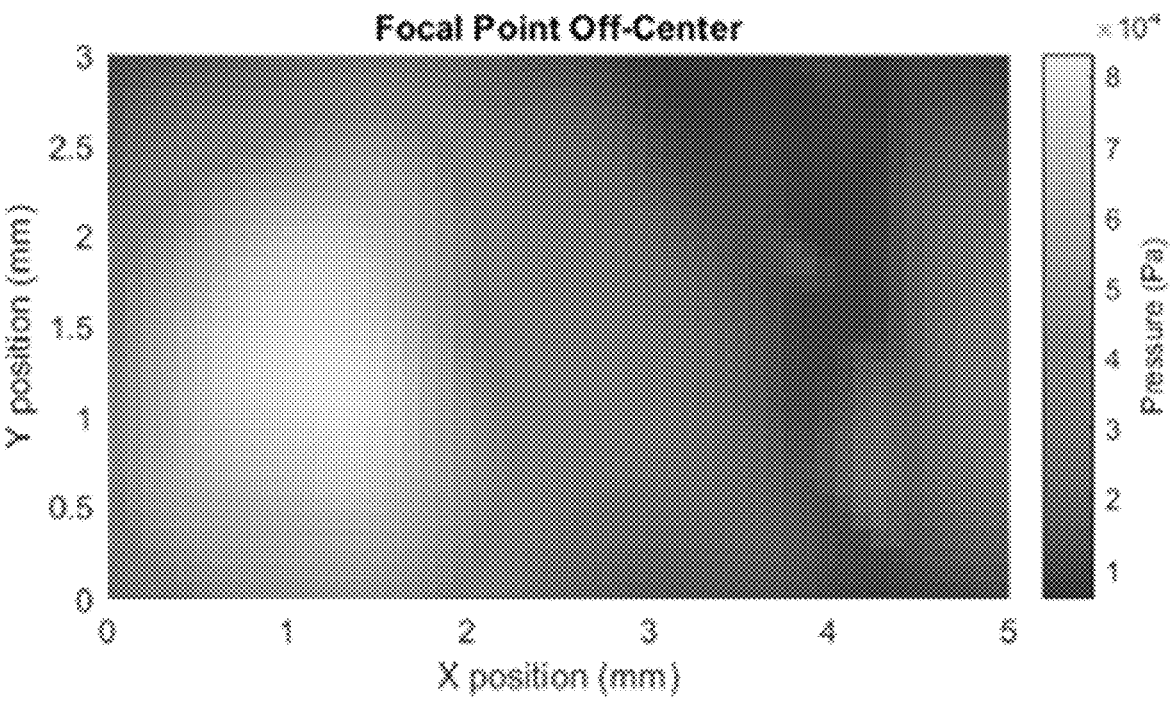

FIGS. 11(A-B) show how the focal point can be steered electronically. In this experiment, the phases were selected to produce a focal point off-center from the array. FIG. 11A shows the focal point in the center of the array, while FIG. 11B shows the focal point off-center.

The relationship between input voltage and pressure amplitude of the ultrasonic wave was established using the hydrophone setup described above. Using a high voltage amplifier, the input voltage was varied from 11 V to 90 V and the resulting pressure amplitude was measured. The relationship between voltage and pressure amplitude was linear with an $R^2$ value of 0.9998.

Figure 12:
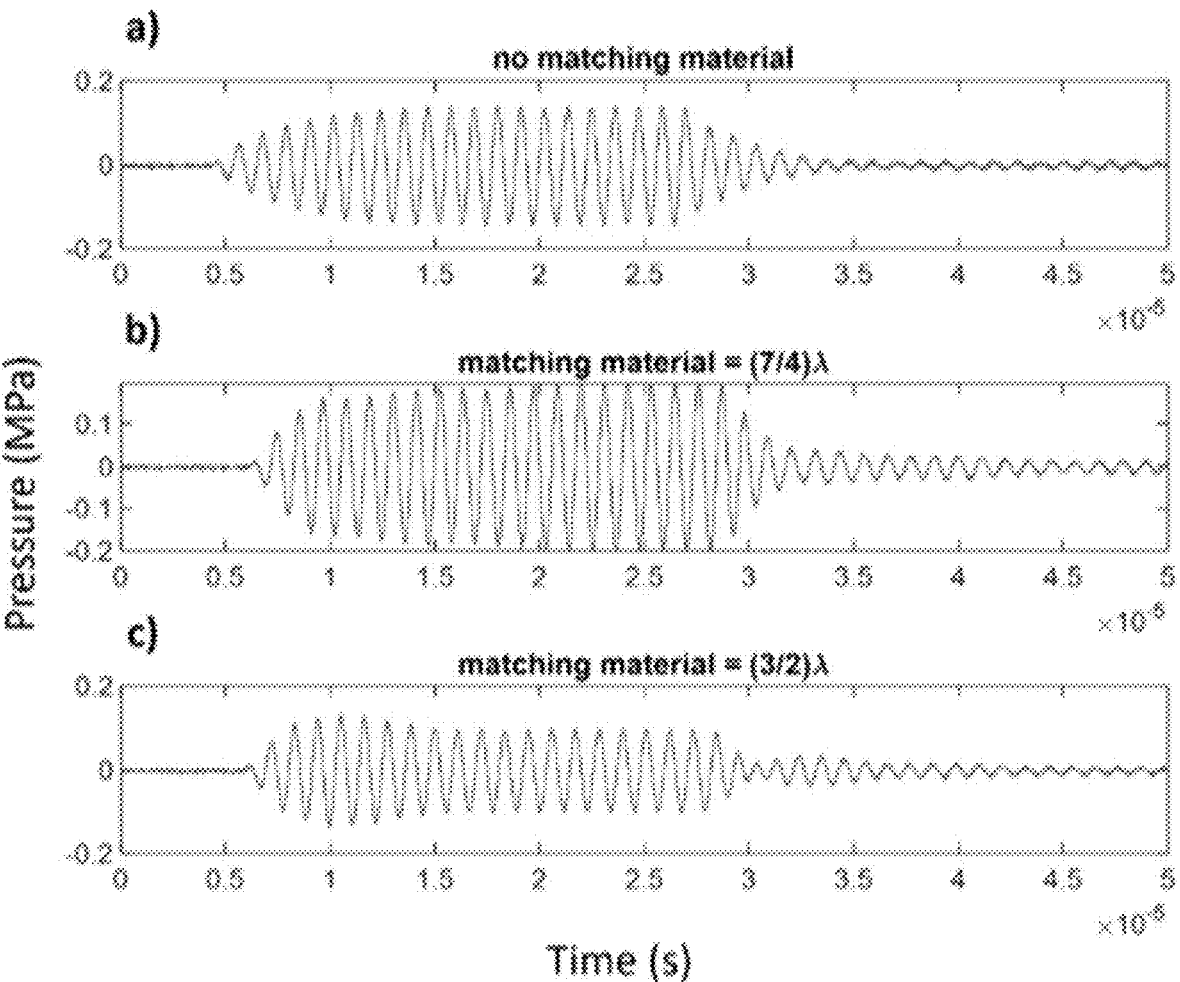
FIG. 12 shows graphs of pressure waves measured in water for various matching configurations.

To validate the effect of the matching material, hydrophone measurements were taken of the generated ultrasonic pressure wave with three different matching configurations: (1) no matching; (2) $3/2\lambda$ thickness matching material; and (3) $7/4\lambda$ matching material, with results shown in FIG. 12. The transducer used in this instance differed from the patterned, phased array transducer described above. The material was 1.5 mm thick, with PZT pillars of $200\times200\,\mu m^2$ footprint, 100 μm kerf, and a volume fill factor of 45%. The total size of the transducer was 12 mm×12 mm, though only a 6×6 mm² quadrant was driven. The transducer was driven at resonance (900 kHz). For each of the tests, the hydrophone was placed roughly 0.5 mm from the bottom of the tank, and the transducer was driven with a uniform signal (i.e., with no phased-array focusing). Because the water in the plastic container is only a couple of inches deep, driving the transducer with a continuous wave results in interference between the waves entering the container and those reflecting off the water-air interface at the top of the tank causing a standing wave effect. A pulsed ultrasonic drive eliminates these measurement artifacts. Specifically, the transducer was driven for 20 μs, or roughly 20 drive cycles, so that by the time the reflected wave returns to the hydrophone from the top of the tank, the drive cycle is over and there is no incoming wave interference. As shown in graph (b) of FIG. 12, adding the quarter-wave matching material increases the pressure amplitude by 40% relative to no matching material. In other words, the transmitted energy is increased by a factor of 1.9 (theory predicts an increase by a factor of 1.7). By contrast, the waveform from the $3/2\lambda$ matching, shown in graph (c) of FIG. 12, indicates a decrease in the amplitude by 27% relative to no matching material, resulting in an energy attenuation factor of 0.54 (as opposed to a predicted factor of 0.66).

Furthermore, due to variations in the speed of sound in the matching material, the actual thickness of the matching material may not be exactly a quarter wavelength multiple, which would reduce the effect of constructive interference in the material.

The ultrasound produced from a uniform excitation is capable of delivering tactile stimulation, despite the small size of the transducer. A small preliminary validation test was performed with the same transducer sample used to obtain the results of FIGS. 11(A-B). A simple tactile threshold test was performed in which subjects were exposed to ever increasing levels of ultrasound until they reported a tactile sensation. The test ran as follows: with their finger placed on the PMMA matching material, and while viewing a graphical user interface displayed on a monitor, the subject was shown two consecutive screens, labeled "Interval 1" and "Interval 2", respectively. Each interval lasted 1 second. The device was turned on during one of the two intervals and left off during the other. The interval at which the device was activated was selected randomly. The subject was then shown another screen where they were instructed to select in which interval the sensation was delivered. The subject could also select "I don't know" or "replay stimulus". If the participant selected the wrong interval, or if they selected "I don't know", the applied drive signal was increased by 10 volts. Once the participant selected the correct interval, the experiment was concluded, and the tactile threshold was recorded as the voltage level at which the correct answer was given. For each of these tests, the drive signal was amplitude modulated at 200 Hz and the PMMA matching material had a thickness of $$\frac{7}{4}\lambda.$$

The transducer was driven with a high voltage using a power amplifier. Among the 4 people tested, all were able to feel a tactile sensation. The average tactile threshold was found at an input voltage of 68.8 V, with a standard deviation of 14.1 V. At the threshold voltage amplitude, the sensation was a faint vibratory tactile stimulus, according to those who participated in the preliminary study. Additionally, tests on the index finger of one subject at a much higher voltage, 240 V, resulted in a notable sensation that had various qualities which ranged from a fast vibration sensation to a pin prick, to heat. We can infer from graph (b) of FIG. 12 and the linearity of the pressure-voltage relationship that the ultrasonic pressure at the threshold voltage was on the order of 7 atm.

Although various examples of the device have been presented herein, as would be realized by those of skill in the art, many variations of the device are possible and are contemplated to be within the scope of the invention. For example, the number of acoustic pixels in the overall device may vary, as well as the number of pillars comprising in each acoustic pixel. The drive electronics for the phased array may be of any appropriate design, for example, as shown in FIG. 7. Further, the height, aspect ratio and cross sectional shape of the pillars may vary dependent on the application.

The invention claimed is:

1. A device comprising:
   an array of pillars composed of a piezocomposite material;
   a plurality of electrodes, each electrode covering a subset of the array of pillars to form an acoustic pixel; and
   a matching layer covering the acoustic pixels, the matching layer being a having an acoustic impedance between the acoustic impedance of the piezocomposite material and the acoustic impedance of a target material;
   wherein the matching layer is segmented into a plurality of segments corresponding to each acoustic pixel; and
   wherein ultrasonic energy generated by the device is directed at a focal point at or below the surface of a user's skin to stimulate a tactile sensation.

2. The device of claim 1 wherein the matching layer is composed of a polymer.

3. The device of claim 2 wherein the polymer is an epoxy-based photoresist.

4. The device of claim 3 wherein the epoxy-based photoresist is SU-8.

5. The device of claim 1 wherein the matching layer is loaded with nanoparticles.

6. The device of claim 2 wherein the polymer has a quantity of nanoparticles mixed therewith.

7. The device of claim 6 wherein the nanoparticles are composed of titanium oxide.

8. The device of claim 7 wherein the nanoparticles are mixed with the polymer in a weight ratio of approximately 30%.

9. The device of claim 1 further comprising:
   an epoxy material disposed between the pillars.

10. The device of claim 1 wherein the pillars have a height to width aspect ratio greater than or equal to 10.

11. The device of claim 1 wherein the pillars have a square cross sectional shape and are approximately 125 µm square× 1.5 mm in height.

12. The device of claim 1 wherein the pillars are spaced 50 µm apart from each other.

13. The device of claim 9 wherein a volume ratio of epoxy to the piezocomposite material in the device is 1:1.

14. The device of claim 1 wherein the electrodes are composed of a layer of copper 2-3 µm in thickness.

15. The device of claim 14 wherein the copper layer has a coating of tin layered thereon.

16. The device of claim 1 wherein each acoustic pixel comprises a 4×4 array of pillars.

17. The device of claim 16 wherein the device comprises a 4×8 array of acoustic pixels.

18. The device of claim 1 wherein each acoustic pixel is driven in a longitudinal mode at a resonance frequency.

19. The device of claim 18 wherein the ultrasonic energy is focused on mechanoreceptors under the surface of the skin.

20. The device of claim 18 wherein the resonance frequency is approximately 1 MHz.

21. The device of claim 1 wherein the acoustic pixels are operated as a phased array such that wavefronts from each acoustic pixel converge at a focus point at or below a surface of the target material.

22. The device of claim 21 wherein the matching layer has a thickness which is an odd multiple of a quarter wavelength of the excitation signal, such that constructive interference between the wavefronts from each acoustic pixel occurs.

23. The device of claim 1 wherein the matching layer is composed of poly(methyl methacrylate).

24. The device of claim 1 further comprising:
   a circuit, for independently driving each acoustic pixel with an excitation signal.

25. The device of claim 24 wherein the excitation signal for each acoustic pixel is time delayed such as to localize the focal point of the device by interference of ultrasonic waves emitted by each acoustic pixel.

26. The device of claim 25 wherein the device is configured to attach to a fingertip.

27. The device of claim 26 wherein the focal point is 1-2 mm below a surface of the fingertip.

28. The device of claim 27 wherein a coupling gel is placed between the matching layer and the fingertip.

29. The device of claim 1 wherein the piezocomposite material is lead zirconate titanate (PZT).

* * * * *